United States Patent
Li et al.

(10) Patent No.: US 9,541,388 B2
(45) Date of Patent: Jan. 10, 2017

(54) DIRECTIONAL SHOCKPROOF TILTING DISPLAY TAG

(75) Inventors: Wenyong Li, Shenzhen (CN); Jun Qin, Shenzhen (CN); Wenchang Li, Shenzhen (CN); Keqin Liu, Shenzhen (CN)

(73) Assignee: Shenzhen AKS Technology Co., Ltd, Shenzhen (CN)

( * ) Notice: Subject to any disclaimer, the term of this patent is extended or adjusted under 35 U.S.C. 154(b) by 120 days.

(21) Appl. No.: 14/426,167

(22) PCT Filed: Sep. 6, 2012

(86) PCT No.: PCT/CN2012/081067
§ 371 (c)(1),
(2), (4) Date: Mar. 5, 2015

(87) PCT Pub. No.: WO2014/036709
PCT Pub. Date: Mar. 13, 2014

(65) Prior Publication Data
US 2015/0226552 A1    Aug. 13, 2015

(51) Int. Cl.
*G01C 9/10*    (2006.01)

(52) U.S. Cl.
CPC .................... *G01C 9/10* (2013.01)

(58) Field of Classification Search
CPC .................................................. G01C 9/10
USPC .............................. 33/365, 366.24; 116/215
See application file for complete search history.

(56) References Cited

U.S. PATENT DOCUMENTS

| | | | | |
|---|---|---|---|---|
| 2,768,602 A | * | 10/1956 | Eichholz | G01P 15/036 116/215 |
| 3,207,122 A | * | 9/1965 | Salembier | B65D 79/02 116/215 |
| 3,688,734 A | * | 9/1972 | Davis | G01C 9/10 116/200 |
| 3,880,108 A | * | 4/1975 | Anton | G01C 9/10 116/215 |
| 4,438,720 A | * | 3/1984 | Conn | G01C 9/00 116/215 |
| 4,924,799 A | * | 5/1990 | Rilling | G08B 5/00 116/206 |

(Continued)

FOREIGN PATENT DOCUMENTS

CN   201955082 U * 8/2011
DE   WO 9615956 A1 * 5/1996 ............. B65D 79/02

*Primary Examiner* — Christopher Fulton (57) ABSTRACT

A directional shockproof tilting display tag, comprising a container provided with a detector therein; the detector comprises a first placement chamber, a second placement chamber, and a baffle; the first placement chamber comprises a first side plate and a first mass block; the first side plate is externally provided with a first extension portion; the second placement chamber comprises a second side plate and a second mass block; the second side plate is externally provided with a second extension portion; the placement chambers are also provided with bar codes; part of the patterns of the bar codes are covered by the mass blocks; a rotary shaft is disposed directly above the placement chambers; the container is also provided with a shockproof structure therein. The display tag has a simple structure and strong shockproof capability. The arrangement of the bar codes ensures the detector can quickly detect an object tilting.

12 Claims, 7 Drawing Sheets

(56) References Cited

U.S. PATENT DOCUMENTS

| | | | | |
|---|---|---|---|---|
| 4,989,334 A * | 2/1991 | DuBose, Jr. | ............ | G01C 9/10 |
| | | | | 116/215 |
| 7,265,680 B2 * | 9/2007 | Igami | ................ | G01C 9/10 |
| | | | | 200/61.45 R |
| 7,353,615 B1 * | 4/2008 | Branch | ................ | G01C 9/12 |
| | | | | 33/366.11 |
| 7,845,086 B2 * | 12/2010 | Makimura | ............ | G01C 3/08 |
| | | | | 33/365 |
| 7,926,194 B2 * | 4/2011 | Katoh | ................ | B65D 79/02 |
| | | | | 116/203 |
| 8,240,270 B2 * | 8/2012 | Naruishi | ............ | B65D 79/02 |
| | | | | 116/200 |
| 8,671,582 B2 * | 3/2014 | Branch | ................ | G01C 9/08 |
| | | | | 116/215 |

\* cited by examiner

DIRECTIONAL SHOCKPROOF TILTING DISPLAY TAG

FIELD

The present utility model relates to a tilt sensor having shockproof function, especially to a novel directional shockproof tilting display tag.

BACKGROUND

In current global economy, goods, materials, manufactured articles and so on are usually to be transported a long distance before they reach their final destination. The shipment process may include a variety of modes of transport: For example, the products usually need to be loaded onto a truck and transported to a train station, need to be loaded onto a rail car and transported to a port by train, need to be loaded onto a cargo ship and transported to an overseas port, or need to be loaded onto a truck and transported to a warehouse; once in the warehouse, the products will be transported via air or ground again before reaching the final customers. With the increase in commodity circulation, especially the increase in the foreign trade, damage to products due to tilt or inversion increases in the loading and unloading process, and sometimes damage is caused by incorrectly handling, e.g., some of the products are easily damaged if they are not transported in a particular position. After the cargoes reach the destination, each cargo is to be unpacked and inspected, which will cost heavy workload. There are various measures known in the art that are used to prevent incorrectly handling of the products during transporting, loading and unloading, including printing the specification on the box so as to keep the preset position. However, this precaution, essentially passive, can neither tell the recipient whether the products have been incorrectly handled or whether the damage is caused by shipment, nor indicate in which direction the products tilt; besides, sometimes the products are artificially reset for evading responsibility, disenabling the recipient of the product to accurately and correctly determine whether the products in the box have been damaged. Therefore, the problem to be solved by the present utility model is to provide a method that is simple and can display and indicate which tilt position of the products is not influenced by a slight shock during transport and cannot be reset artificially.

SUMMARY

The technical problem to be solved by the present utility model is to overcome the above shortcomings of the prior art.

A purpose of the present utility model is to provide a tilting display tag having a simple structure.

Another purpose of the present utility model is to provide a tilting display tag that is convenient to determine whether an object ever tips, turns over or inclines at an angle greater than a preset angle.

Another purpose of the present utility model is to provide a tilting display tag having strong shockproof capability.

Another purpose of the present utility model is to provide a tilting display tag that can prevent artificial reset.

Another purpose of the present utility model is to provide a tilting display tag that can display on the left and right sides whether tilting has occurred.

Another purpose of the present utility model is to provide a tilting display tag that can quickly detect an object tilting by a detector and thus facilitate speedy goods delivery.

The present utility model adopts the following technical solution to solve its technical problem:

A directional shockproof tilting display tag is provided, comprising a container provided with a detector therein; the detector comprises a first placement chamber, a second placement chamber, and a baffle; the first placement chamber and the second placement chamber are integrally provided, with the baffle disposed between the first placement chamber and the second placement chamber; the first placement chamber comprises a first side plate and a first mass block, wherein the first side plate is disposed on the external side of the first placement chamber, and the first mass block is disposed within a cavity formed by the first side plate and the first placement chamber; the second placement chamber comprises a second side plate and a second mass block, wherein the second side plate is disposed on the external side of the second placement chamber, and the second mass block is disposed within a cavity formed by the second side plate and the second placement chamber; a rotary shaft is disposed directly above the placement chambers; the container is also provided inside with a shockproof plate, which is provided with a rotary-shaft through hole that coincides with the rotary shaft in the peripheral size, with the shockproof plate sleeved on the rotary shaft through the rotary-shaft through hole; the shockproof plate is provided and integrated with a first rotary plate and a second rotary plate.

Preferably, the side plate is provided in a tilting state, with the tilt angle of the side plate coinciding with the maximum tilt angle allowed by the tagged object.

Preferably, the first side plate is externally provided with a first extension portion, and the second side plate is externally provided with a second extension portion.

Preferably, the first placement chamber is provided with a first bar code, and the second placement chamber is provided with a second bar code; the first and second bar codes are provided on the side of the placement chamber in the rear of the first and second mass blocks, with part of the patterns of the first and second bar codes covered by the first and second mass blocks. The bar code allows quick detection of an object tilting by a detector and thus facilitates speedy goods delivery.

Preferably, the first and second bar codes are a one-dimensional bar code or a two-dimensional bar code.

Preferably, the mass block is made of nonmetallic materials, so as to prevent artificial reset of the mass block by an object such as a magnet.

Preferably, the container is provided in the front with a transparent case for convenient observation of the object tilting situation.

Preferably, an ultrasonic welding seam is formed between the case and the container by high-frequency ultrasonic welding to prevent artificial reset.

Preferably, the first and second mass blocks respond to a first shock frequency, and the first and second rotary plates respond to a second shock frequency, with the second shock frequency different from the first shock frequency so as to improve the shockproof capability.

Preferably, the shockproof plate drives the first and second rotary plates to rotate around the rotary shaft by 360 degrees, the first rotary plate being disposed up and down in correspondence to the first side plate, the first rotary plate not exceeding the top of the first side plate in length; the second rotary plate is disposed up and down in correspondence to the second side plate, with the second rotary plate not exceeding the top of the second side plate in length.

Preferably, the first placement chamber is provided with a first through hole, and the second placement chamber is provided with a second through hole, with the first and second through holes provided on the upper side of the first and second mass blocks; a crossbar can be inserted into the first through hole and/or the second through hole to prevent movement of the first mass block and/or the second mass block, so as to insert the crossbar into the through hole to prevent movement of the mass block when the tag is not in use.

The container is provided on its wall with a first buffer plate and a second buffer plate, which are disposed in parallel with the bottom of the placement chamber so as to prevent the mass block from falling down directly after escaping from the placement chamber and damaging the container because of the too great gravity.

The present utility model has the following beneficial effects relative to the prior art:

(1) The tilting display tag in the present utility model has a simple design structure and less difficulty in processing, can save a lot of manpower and material resources, and reduces cost;

(2) the present utility model, with the structural arrangement on the left and right sides, can display whether an object tips or inclines in different directions;

(3) the present utility model, by providing mass blocks having different angular positions, can display tilting at a plurality of angles;

(4) the mass block in the present utility model is made of nonmetallic materials, so as to prevent artificial reset of the mass block by an object such as a magnet and ensure to the maximum extent that the mass block is not reset;

(5) the tilt angle of the side plate in the present utility model, coinciding with the maximum tilt angle allowed by the tagged object, can be set according to the tilt angle of different objects, which is convenient and easy to use;

(6) the container in the present utility model is provided in the front with a transparent case for convenient observation of the object tilting situation, wherein the case and the container are welded by high-frequency ultrasonic welding, which eliminates the clipping connection of the prior art, and prevents artificial opening of the case to put the mass block into the placement chamber before resetting the case, thus ensuring recording reliability;

(7) in the present utility model, the shockproof plate is sleeved on the rotary shaft and integrated with the rotary plate, which prevents the rotary plate from moving back and forth when the object is vibrated and facilitates response of the rotary plate to the second shock frequency, thus improving shockproof performance of the tag;

(8) in the present utility model, with a bar code provided on the side of the rear of the mass block in the placement chamber, part of the pattern of the bar code is covered by the mass block when the object does not tilt, while the pattern of the bar code is completely displayed because of slipping of the mass block out of the placement chamber when the object tilts, and therefore the corresponding information can be detected by a detector, thus facilitating speedy goods delivery;

(9) on the side of the side plate in the present utility model, with the first and second through holes provided corresponding to the upper side of the mass block, when the tag is not in use, a crossbar is inserted into the through hole to prevent movement of the mass block, thus ensuring normal use of the tag and reducing the loss due to non-normal use; this product can save a lot of manpower, material resources and energy, reduce cost to some extent, and have good economic benefits.

BRIEF DESCRIPTION OF THE DRAWINGS

FIG. 2-1 is a schematic drawing of the state when tilting occurs on the right side at a first angle;

FIG. 2-2 is a schematic drawing of the state when tilting occurs on the right side at a second angle; and FIG. 2-3 is a schematic drawing when tilting occurs on the right side before returning to the upright state;

FIG. 4-1 is a schematic drawing of providing a bar code in the placement chamber in the present utility model (before assembly);

FIG. 4-2 is a schematic drawing of the state of the bar code after the present utility model is assembled, with part of the bar code in the placement chamber covered; and FIG. 4-3 is a schematic drawing of the state of the bar code after the present utility model is used, with tilting occurring on the right side.

LIST OF REFERENCE NUMBERS

1. First rotary plate; 2. first mass block; 3. first side plate; 4. first buffer plate; 5. second buffer plate; 6. second side plate; 7. second mass block; 8. second rotary plate; 9. baffle; 11. rotary shaft; 12. shockproof plate; 13. first extension portion; 14. container; 15. second extension portion; 16. junction of the top of the side plate and the extension portion; 17. first placement chamber; 18. second placement chamber; 19. case; 21. ultrasonic welding seam; 22. first through hole; 23. second through hole; 24. first bar code; and 25. second bar code.

DETAILED DESCRIPTION OF THE EMBODIMENTS

The preferred embodiments of the present utility model will be further described below in detail with reference to drawings.

As shown in FIGS. 1, 2-1, 2-2, 2-3, 3, 4-1, 4-2, and 4-3, this novel directional shockproof tilting display tag has a simple structure and strong shockproof capability, can determine whether an object ever tips, turns over or inclines at a specific angle greater than a preset angle, and can prevent artificial reset. One or more of the novel directional shockproof tilting display tags are affixed to one or more walls of an object such as a shipping package, so as to determine whether this shipping package is maintained in the recommended position during shipment and does not exceed the preset maximum tilt angle. The shipping package may have any conventional forms, such as crates, pallets, boxes, cartons, barrels, drums, cans, bottles or other containers containing goods before shipment. Alternatively, this novel directional shockproof tilting display tag can be placed directly on the goods, and thus the objects bearing this novel shockproof tilting display tag can be goods, containers containing the goods and the like. Besides, the tags on one or more sides of the package show that the top side is upward, so as to indicate that the top side should always be kept at the top, thereby the package marked to prevent tipping or tilting.

Figure 1:
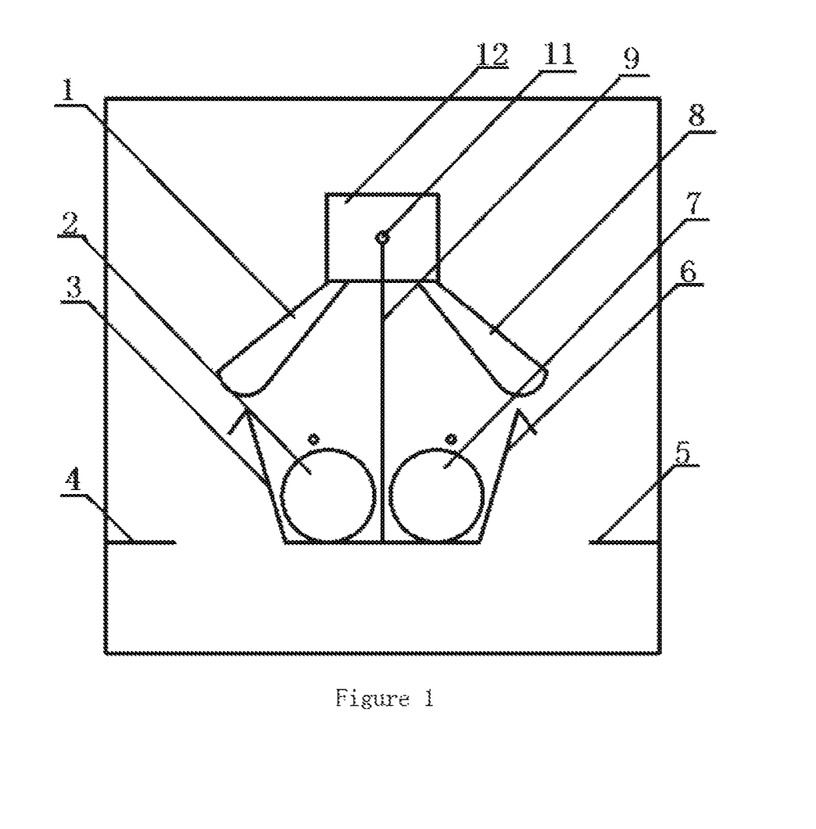
FIG. 1 is a schematic drawing of the front structure of the present utility model.

As shown in FIG. 1, a novel directional shockproof tilting display tag is provided, comprising a container 14 provided with a detector therein; the detector comprises a first placement chamber 17, a second placement chamber 18, and a baffle 9; the first placement chamber 17 and the second placement chamber 18 are integrally provided, with the baffle 9 disposed between the first placement chamber 17 and the second placement chamber 18; the first placement chamber 17 comprises a first side plate 3 and a first mass block 2, with the first side plate 3 disposed on the external side of the first placement chamber 17; the first side plate 3 is provided in a tilting state, with the tilt angle of the side plate coinciding with the maximum tilt angle allowed by the tagged object; the first side plate 3 is externally provided with a first extension portion 13, and the first mass block 2 is disposed within a cavity formed by the first side plate 3 and the first placement chamber 17; the second placement chamber 18 comprises a second side plate 6 and a second mass block 7, with the second side plate 6 disposed on the external side of the second placement chamber 18; the second side plate 6 is provided in a tilting state, with the tilt angle of the side plate coinciding with the maximum tilt angle allowed by the tagged object; and the second side plate 6 is externally provided with a second extension portion 15, with the second mass block 7 disposed within a cavity formed by the second side plate 6 and the second placement chamber 18.

As a preferred embodiment, the mass blocks 2 and 7 are made of nonmetallic materials, so as to prevent artificial reset of the mass block by an object such as a magnet and thus ensure recording reliability.

Figure 41:
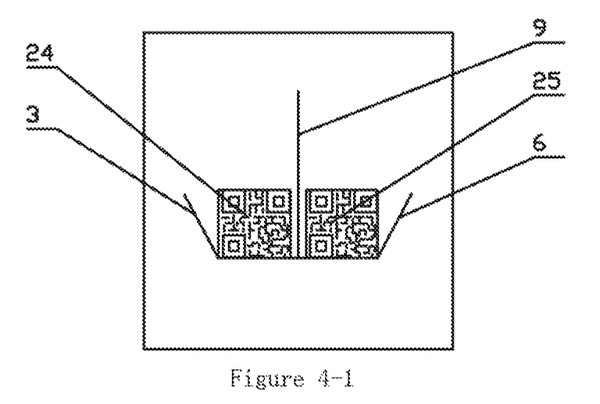
Figure 42:
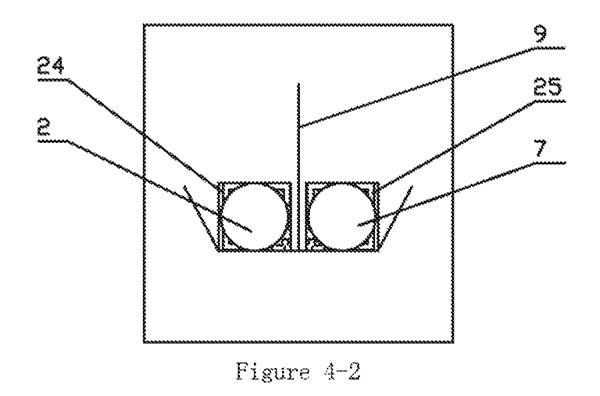
Figure 43:
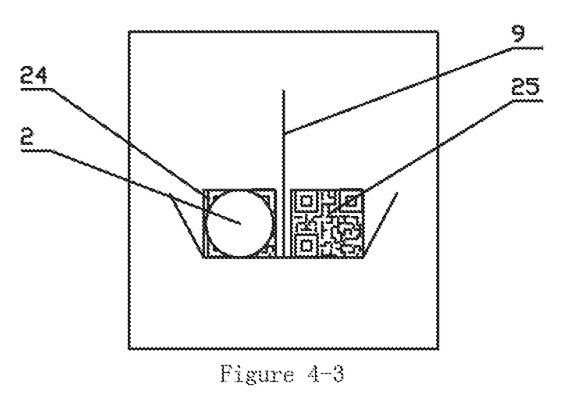

As a preferred embodiment, as shown in FIGS. 4-1 and 4-2, the first placement chamber 17 is provided with a first bar code 24, and the second placement chamber 18 is provided with a second bar code 25; the first bar code 24 and the second bar code 25 are provided on the side of the placement chambers 17 and 18 in the rear of the first mass block 2 and the second mass block 7, with at least part of the patterns of the first bar code 24 and the second bar code 25 covered by the first mass block 2 and the second mass block 7; the bar codes 24 and 25 are a one-dimensional bar code or a two-dimensional bar code. As shown in FIG. 4-2, when the object does not tilt, part of the pattern of the bar code is covered by the mass blocks 2 and 7. As shown in FIG. 4-3, when the object does not tilt, because the mass blocks 2 and 7 slip out of the placement chambers 17 and 18, the pattern of the bar code is completely displayed, and therefore the corresponding information thereof can be detected by a detector.

As a preferred embodiment, a rotary shaft 11 is disposed directly above the placement chambers 17 and 18; the container 14 is also provided inside with a shockproof plate 12, which is provided with a rotary-shaft through hole that coincides with the rotary shaft 11 in the peripheral size, with the shockproof plate 12 sleeved on the rotary shaft 11 through this rotary-shaft through hole; the shockproof plate 12 is provided and integrated with a first rotary plate 1 and a second rotary plate 8.

As a preferred embodiment, the shockproof plate 12 drives the rotary plates 1 and 8 to rotate around the rotary shaft by 360 degrees, the first rotary plate 1 being disposed up and down in correspondence to the first side plate 3, the first rotary plate 1 not exceeding the top of the first side plate 3 in length; the second rotary plate 8 is disposed up and down in correspondence to the second side plate 6, with the second rotary plate 8 not exceeding the top of the second side plate 6 in length; the mass blocks 2 and 7 respond to the first shock frequency, and the rotary plates 1 and 8 respond to the second shock frequency, with the second shock frequency different from the first shock frequency. Therefore, the following phenomenon is avoided: when the object is vibrated, the rotary plates 1 and 8 move back and forth in response to the second shock frequency, which makes the mass block escape and thus results in false indication.

As a preferred embodiment, the container is provided on its wall with a first buffer plate 4 and a second buffer plate 5, which are disposed in parallel with the bottom of the placement chamber 17 and 18, so as to prevent the mass blocks 2 and 7 from falling down directly after escaping from the placement chambers 17 and 18 and damaging the container because of the too great gravity.

Figure 3:
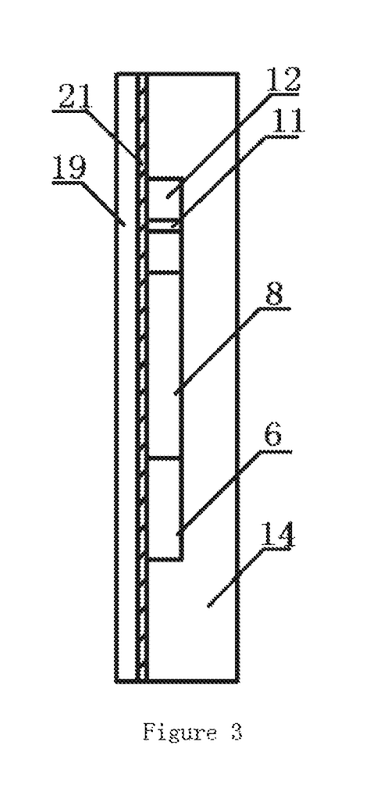
FIG. 3 is a schematic drawing of the side structure of the present utility model.
Figure 21:
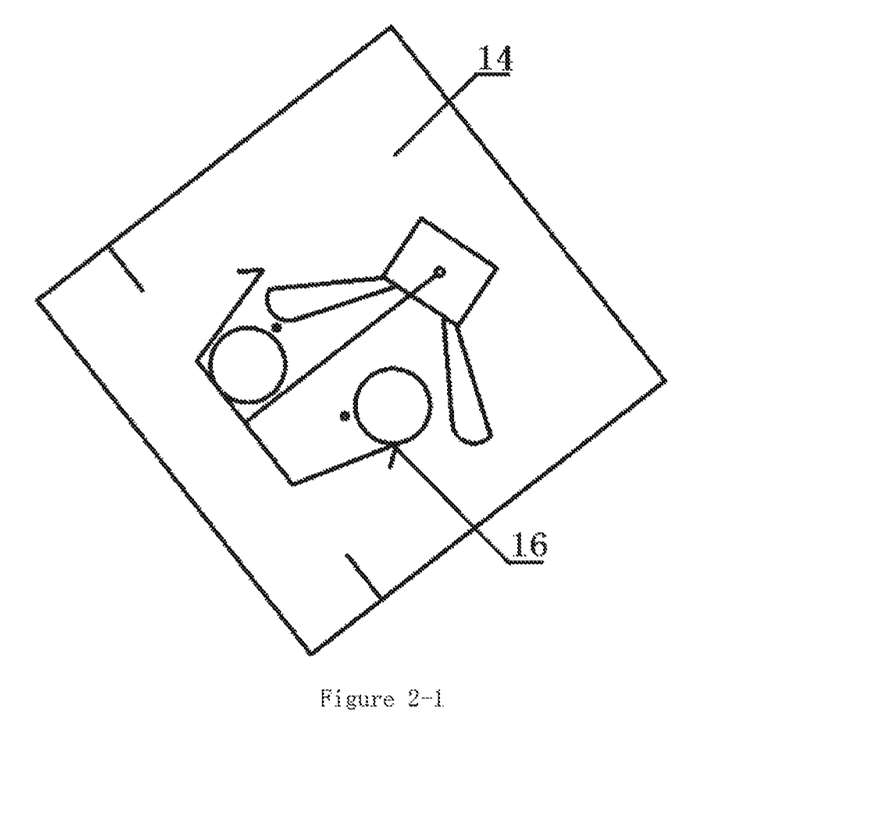
Figure 22:
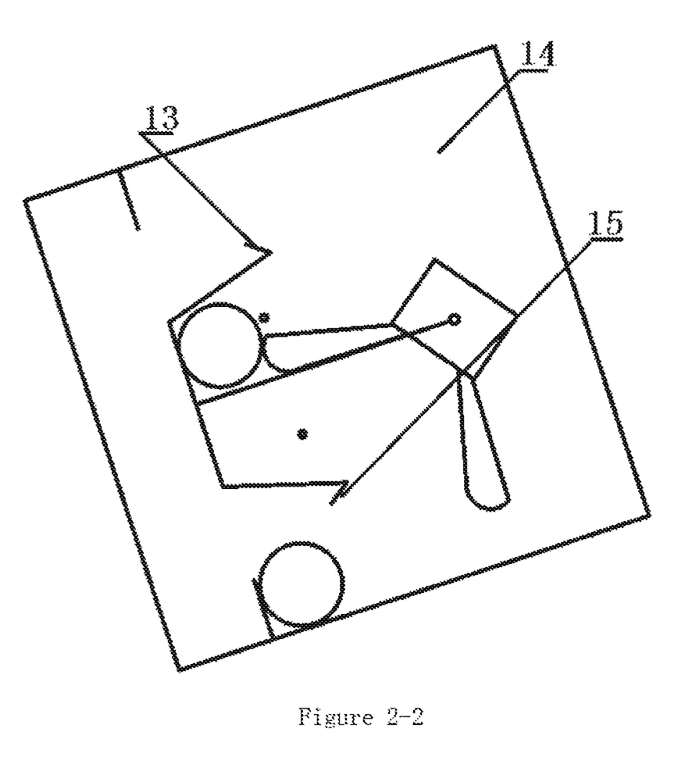
Figure 23:
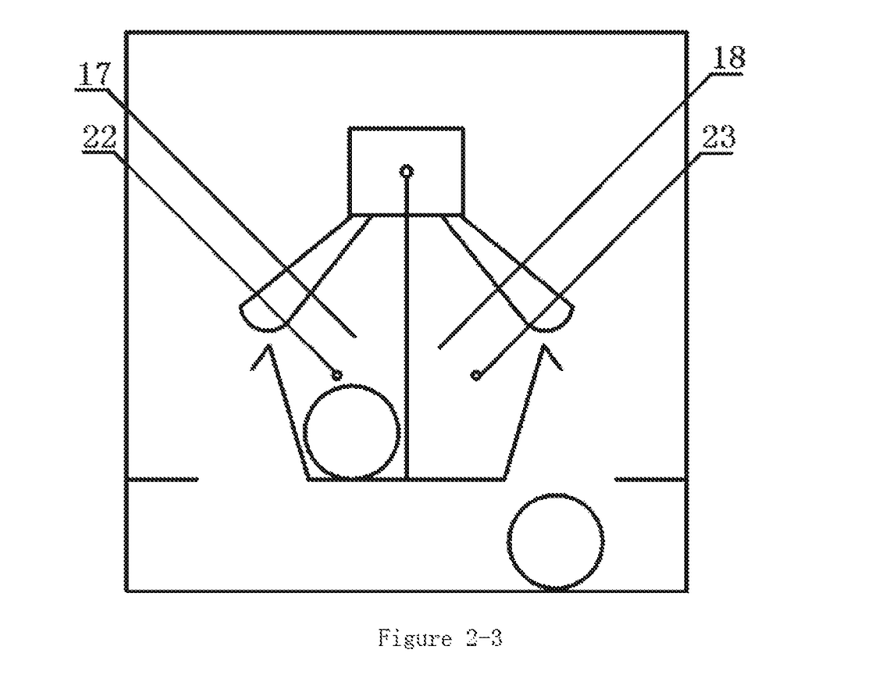

As a preferred embodiment, as shown in FIG. 3, the container 14 is provided in the front with a transparent case 19 for convenient observation of the object tilting situation.

As a preferred embodiment, as shown in FIG. 3, an ultrasonic welding seam 21 is formed between the case 19 and the container 14 by high-frequency ultrasonic welding, which eliminates the clipping connection of the prior art and prevents artificial reset, thus ensuring reliability of the tag recording.

As a preferred embodiment, as shown in FIG. 1, the first placement chamber 17 is provided with a first through hole 22, and the second placement chamber 18 is provided with a second through hole 23, with the through holes provided corresponding to the upper side of the mass blocks 2 and 7; when the tag is not in use, a crossbar is inserted into the through hole to prevent movement of the mass block.

The novel directional shockproof tilting display tag of the present utility model is used in the following way:

If the maximum tilt angle allowed by the object using this novel directional shockproof tilting display tag is for example 50 degrees (those skilled in the art are easy to understand that other angles can be set according to the actual situation), the side plate is disposed on the external side of the placement chamber at an angle of 50 degrees to the horizontal. When the object is put upward, the first mass block 2 and the second mass block 7 are disposed within a cavity formed by the first side plate 3 and the first placement chamber 17 as well as a cavity formed by the second side plate 6 and the second placement chamber 18, respectively, with the first rotary plate 1 disposed up and down in correspondence to the first side plate 3 and the second rotary plate 8 disposed up and down in correspondence to the second side plate 6. When shock occurs during transport of the object, the detector will also vibrate immediately: when the detector responds to the second shock frequency, the shockproof plate 12 sleeved on the rotary shaft 11 reduces the shock frequency of the rotary plates 1 and 18, and prevents the rotary plate from responding to the second shock frequency to move back and forth, which makes the rotary plates 1 and 8 move away from the top of the side plates 3 and 6 and makes the mass block escape, thus resulting in false indication. When shock occurs during transport of the object, if the tilt angle is greater than 50 degrees, such as the object tilts to the right by 60 degrees, as shown in FIG. 2-2, here the second rotary plate 8 will move away from the top of the second side plate 6 by a corresponding angle, and the first rotary plate 1 will also move to the right by a corresponding angle immediately, and then the second mass block 7 will fall off the top of the second side plate 6 (i.e., the junction of the top of the side plate and the extension portion) and directly into the second buffer plate 5. After the object is reset, as shown in FIG. 2-3, the first rotary plate 1 and the second rotary plate 8 will then return to the initial position, and the second mass block 7, after buffered by the second buffer plate 5, will slip into the bottom of the container from the buffer plate. When shock occurs during transport of the object, if the tilt angle is greater than 50 degrees, such as the object tilts to the left by 70 degrees, here the first rotary plate 1 will move away from the top of the first side plate 3 by a corresponding angle, and the second rotary plate 8 will also move to the left by a corresponding angle immediately, and then the first mass block 2 will fall off the top of the first side plate 3 (i.e., the junction of the top of the side plate and the extension portion) and directly into the first buffer plate 4. After the object is reset, the first rotary plate 1 and the second rotary plate 8 will then return to the initial position, and the first mass block 2, after buffered by the first buffer plate 4, will slip into the bottom of the container from the buffer plate. When the object tilts at a greater angle, such as the object tilts to the right by 80 degrees, here the first rotary plate 1 will move to the right by a corresponding angle and be blocked by the baffle 9. After the object is reset, the first rotary plate 1 and the second rotary plate 8 will then return to the initial position, thus preventing the object from tilting to a direction by an overlarge angle to disenable the rotary plate 1 and the rotary plate 8 to be reset for continuous good detection of object tilting situation, which can make the detection more precise. The same principle also works when the object tilts to the left. Besides, the bar codes 24 and 25 are provided on the side plate of the placement chambers 17 and 18 in the rear of the mass blocks 2 and 7, and can be a one-dimensional bar code or a two-dimensional bar code. Because the two-dimensional bar code can store captions, numbers or other symbols with strong storage capacity, the two-dimensional code is used in this example. Captions are provided in the two-dimensional bar code, e.g. indicating that tilt has occurred in the left or right. When the object does not tilt, as shown in FIG. 4-2, part or all of the pattern of the bar codes 24 and 25 is covered by the mass blocks 2 and 7, and no bar code information is detected by a handheld detector, indicating that the object does not tilt. When the object tilts at various angles mentioned above, as shown in FIG. 4-3, because the mass blocks 2 and 7 slip out of the placement chambers 17 and 18, the pattern of the bar codes 24 and 25 is completely displayed, and therefore the corresponding information can be detected by a detector, e.g., it can be learnt more effectively and accurately whether the object has tilted when tilt has occurred in the left or right. The mass blocks 2 and 7 are made of nonmetallic materials, so as to prevent artificial reset of the mass block by an object such as a magnet. In addition, the case 19 and the container 14 are welded by high-frequency ultrasonic welding 21, which eliminates the clipping connection of the prior art and prevents artificial reset, thus ensuring reliability of the tag recording.

What is disclosed above is only some of the specific embodiments of the present utility model. However, the present utility model is not limited thereto. Any alteration or substitution that those skilled in the art can easily think of within the technical scope disclosed by the present utility model should fall within the scope of protection of the present utility model. Therefore, the scope of protection of the present utility model should be based on the scope of protection as claimed by the claims of the present utility model.

What is claimed is:
1. A directional shockproof tilting display tag, characterized in that:
the tilting display tag comprises a container provided with a detector therein; the detector comprises a first placement chamber, a second placement chamber, and a baffle; the first placement chamber and the second placement chamber are integrally provided, with the baffle disposed between the first placement chamber and the second placement chamber; the first placement chamber comprises a first side plate and a first mass block, wherein the first side plate is disposed on the external side of the first placement chamber, and the first mass block is disposed within a cavity formed by the first side plate and the first placement chamber; the second placement chamber comprises a second side plate and a second mass block, wherein the second side plate is disposed on the external side of the second placement chamber, and the second mass block is disposed within a cavity formed by the second side plate and the second placement chamber;
a rotary shaft is disposed directly above the first placement chamber and the second placement chamber;
the container is also provided inside with a shockproof plate, which is provided with a rotary-shaft through hole that coincides with the rotary shaft in the peripheral size, with the shockproof plate sleeved on the rotary shaft through the rotary-shaft through hole; the shockproof plate is provided and integrated with a first rotary plate and a second rotary plate.

2. The directional shockproof tilting display tag according to claim 1, characterized in that: the side plate is provided in a tilting state, with the tilt angle of the side plate coinciding with the maximum tilt angle allowed by the tagged object.

3. The directional shockproof tilting display tag according to claim 1, characterized in that: the first side plate is externally provided with a first extension portion, and the second side plate is externally provided with a second extension portion.

4. The directional shockproof tilting display tag according to claim 1, characterized in that: the first placement chamber is provided with a first bar code, and the second placement chamber is provided with a second bar code; the first bar code and the second bar code are provided on the side of the placement chamber in the rear of the first mass block and the second mass block, with at least part of the patterns of the first bar code and the second bar code covered by the first mass block and the second mass block.

5. The directional shockproof tilting display tag according to claim 4, characterized in that: the first bar code and the second bar code are a one-dimensional bar code or a two-dimensional bar code.

6. The directional shockproof tilting display tag according to claim 1, characterized in that: the mass block is made of nonmetallic materials.

7. The directional shockproof tilting display tag according to claim 1, characterized in that: the container is provided in the front with a case that is at least partly transparent.

8. The directional shockproof tilting display tag according to claim 7, characterized in that: an ultrasonic welding seam is formed between the case and the container by high-frequency ultrasonic welding.

9. The directional shockproof tilting display tag according to claim 1, characterized in that: the first mass block and the second mass block respond to a first shock frequency, and the first rotary plate and the second rotary plate respond to a second shock frequency, with the second shock frequency different from the first shock frequency.

10. The directional shockproof tilting display tag according to claim 1, characterized in that: the shockproof plate drives the first rotary plate and the second rotary plate to rotate around the rotary shaft by 360 degrees, the first rotary plate being disposed up and down in correspondence to the first side plate, the first rotary plate not exceeding the top of the first side plate in length; the second rotary plate is disposed up and down in correspondence to the second side plate, with the second rotary plate not exceeding the top of the second side plate in length.

11. The directional shockproof tilting display tag according to claim 1, characterized in that: the first placement chamber is provided with a first through hole, and the second placement chamber is provided with a second through hole, with the first through hole and the second through hole provided on the upper side of the first mass block and the second mass block; a crossbar can be inserted into the first through hole and/or the second through hole to prevent movement of the first mass block and/or the second mass block.

12. The directional shockproof tilting display tag according to claim 1, characterized in that: the container is provided on its wall with a first buffer plate and a second buffer plate, which are disposed in parallel with the bottom of the first placement chamber and the second placement chamber.

\* \* \* \* \*